(12) United States Patent
Tanaka

(10) Patent No.: US 6,704,253 B2
(45) Date of Patent: Mar. 9, 2004

(54) DISK DRIVE APPARATUS CAPABLE OF RESUMING THE RECORDING PROCESS DURING INTERRUPTION

(75) Inventor: Toru Tanaka, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/374,628

(22) Filed: Feb. 26, 2003

(65) Prior Publication Data
US 2003/0165093 A1 Sep. 4, 2003

(30) Foreign Application Priority Data
Mar. 4, 2002 (JP) ........................................ 2002-057304

(51) Int. Cl.[7] .............................................. G11B 21/08
(52) U.S. Cl. ................................ 369/30.24; 369/30.36; 369/30.93
(58) Field of Search ........................ 369/30.24, 30.36, 369/30.23, 30.1, 30.11, 30.12, 30.13, 47.34, 47.32, 47.44

(56) References Cited

U.S. PATENT DOCUMENTS

| | | | | |
|---|---|---|---|---|
| 5,365,502 A | * | 11/1994 | Misono | 369/30.24 |
| 5,457,672 A | * | 10/1995 | Shinada et al. | 369/53.37 |
| 5,831,946 A | * | 11/1998 | De Bie | 369/30.36 |
| 6,188,650 B1 | * | 2/2001 | Hamada et al. | 369/30.36 |
| 6,388,961 B1 | * | 5/2002 | Ijichi | 369/30.36 |
| 6,430,120 B1 | * | 8/2002 | Chritz et al. | 369/30.12 |

FOREIGN PATENT DOCUMENTS

| | | | | |
|---|---|---|---|---|
| JP | 4339386 | * | 11/1992 | 369/30.24 |
| JP | 4.349270 A | * | 12/1992 | 369/30.24 |

* cited by examiner

Primary Examiner—Tan Dinh
(74) Attorney, Agent, or Firm—Hogan & Hartson, LLP

(57) ABSTRACT

During an operation to change the recording speed, an optical pickup (3) is retracted so as to play back a signal that has already been recording onto a disc D. A synchronization signal obtained from the signal that is played back by the optical pickup (3) and a recording reference signal are synchronized, and the recording operation is resumed from a recording interrupted position. The position where the optical pickup (3) is to be retracted is set on the basis of the time required to change the recording speed. Also, a rotational speed change operation for a spindle motor (1) for rotationally driving a disc D and the retract operation for the optical pickup (3) are performed concurrently.

7 Claims, 2 Drawing Sheets

DISK DRIVE APPARATUS CAPABLE OF RESUMING THE RECORDING PROCESS DURING INTERRUPTION

BACKGROUND OF THE INVENTION

1. Field of the Invention

The present invention relates to an optical disc recording and playback apparatus that is configured so as to record signals onto a disc by a light beam emitted from a laser element built into an optical pickup, and to perform a playback operation of the signals that have been recorded on the disc by the light beam.

2. Description of the Related Art

Disc players for performing operations to read signals that have been recorded on a disc using an optical pickup are popular. However, in addition to the playback function, optical disc recording and playback apparatuses, which are configured to enable the recording of signals to discs by a light beam emitted from a laser element built into the optical pickup, have recently been manufactured on a commercial basis.

This optical disc recording and playback apparatus is configured so that the recording operation is performed on the basis of a synchronization signal that is sampled from a wobble signal obtained from groove called a wobble that is provided on the disc, and of a recording reference signal.

The optical disc recording and playback apparatus is configured so that the signal recording operation is performed according to a recording command from a computer apparatus, which is a host. This recording operation first stores into a buffer RAM a signal, which is to be recorded onto a disc, then performs the signal recording operation to the disc by reading out the signal stored in the buffer RAM.

In a state where the signal recording operation to the disc is performing normally, the write operation to the buffer RAM of the recording signal that is output from the computer apparatus, the read operation of the signal from the buffer RAM, and the recording operation to the disc of the signal that was read are performed to correspond to the quantity of the recording signals and the status of the recording to the disc.

Recording speeds are increased in order to perform the signal recording operation to the disc in a short period of time. However, when the quantity of the recording signals stored in the buffer RAM is insufficient while a high-speed signal recording operation is performed, a state occurs where the signal recording operation to the disc cannot be performed, namely, a condition called buffer under run occurs. As a method to solve this problem, a technique has been developed to temporarily stop the recording operation to the disc when the quantity of the recording signals stored in the buffer RAM drops below a predetermined value, or a recording interrupt preset value, and to resume the recording operation to the disc when the quantity of the recording signals stored in the buffer RAM exceeds a predetermined value, or a recording resume preset value.

As described above, a method exists for solving the problem of buffer under run by interrupting, then resuming the recording. The operation to resume the recording plays back the signal that has been recorded on the disc prior to the recording interruption by retracting the optical pickup from the recording interrupted position, synchronizes a synchronization signal that is included in the played back signal with a recording reference signal, and resumes the recording operation when synchronization is achieved.

The signal recording operation to the disc in the optical disc recording and playback apparatus is performed at a state of constant linear velocity. When rotationally driving the disc at a state of constant linear velocity, the angular speed of rotation is faster at the inside of the disc compared to the outside. Therefore, it is difficult to rotationally drive the spindle motor at the same high constant linear velocity from the inside to the outside of the disc.

As a method to solve this problem, a technique has been developed to change the linear velocity to a faster linear velocity as the recording position moves from the inside to the outside of the disc, namely, as the recording position moves to a position where the recording linear velocity can be increased. This operation to change the recording speed first stops the recording operation when a point is reached where the recording speed is to be changed, and performs a control operation for resuming the recording when the rotational speed of the disc attains a fast constant linear velocity due to an increase in the rotational speed of the spindle motor.

The operation to change the recording linear velocity was performed by interrupting and resuming the recording operation as described above. In the conventional technique, when the operation to change the rotational speed of the disc is performed after interruption of the recording operation, the position of the optical pickup is retracted to a fixed position from the recording interrupted position, and in this state the rotational speed is changed, and after the rotation stabilizes, a control operation is performed to resume the recording. For this reason, the time required from when the recording was interrupted until when the recording operation is resumed becomes long, which prevents the speed for the recording operation from being increased.

SUMMARY OF THE INVENTION

When the recording linear velocity is to be changed, the present invention concurrently retracts the pickup and changes the recording linear velocity. For this reason, the interruption time can be shortened. Furthermore, the amount of retraction of the recording position is determined while taking into consideration the time required to change the recording linear velocity of the disc. As soon as the change in the recording linear velocity completes, the recording can be resumed.

DETAILED DESCRIPTION OF THE PREFERRED EMBODIMENTS

Figure 1:
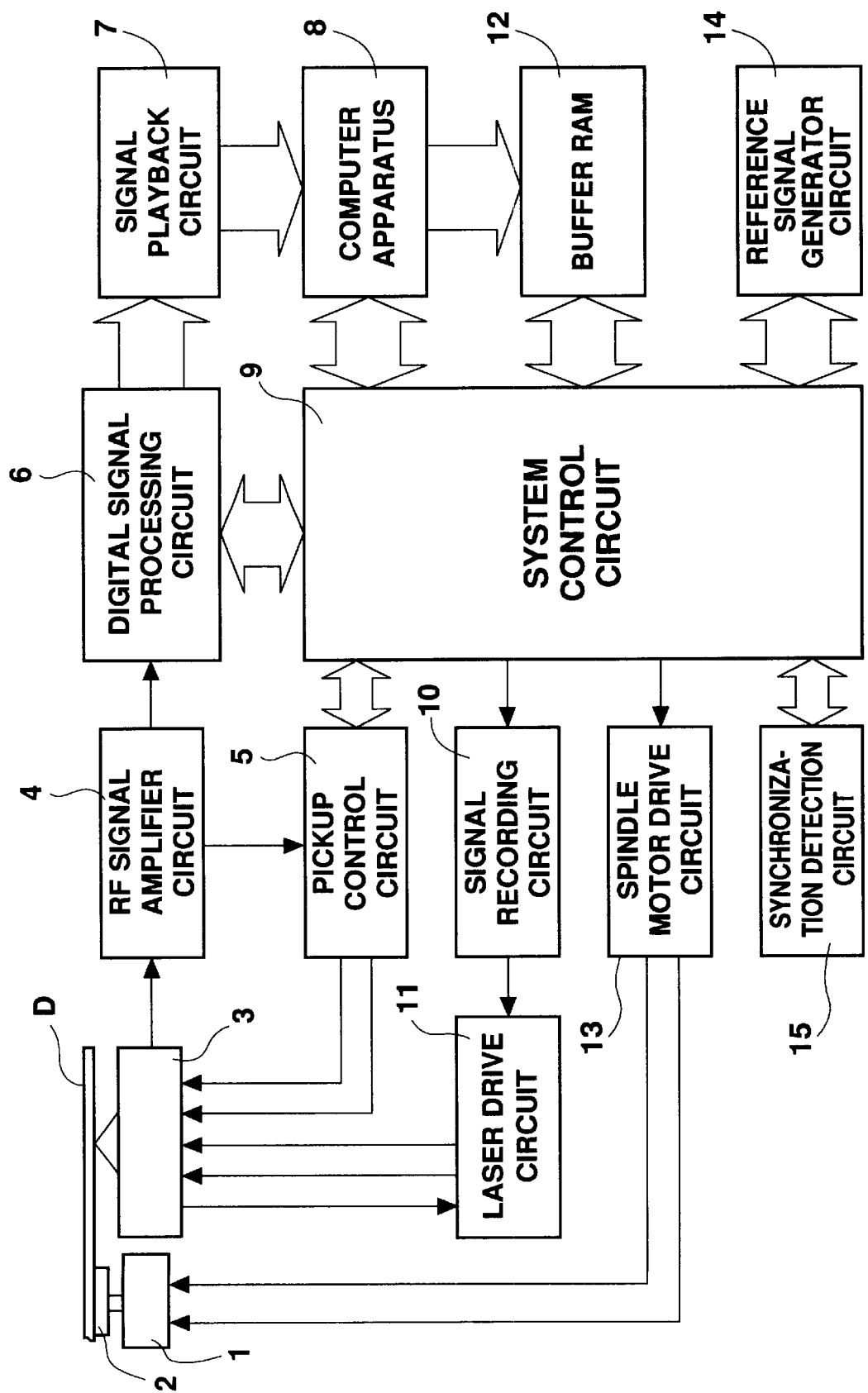
FIG. 1 is a block diagram showing an embodiment of an optical disc recording and playback apparatus relating to the present invention.
Figure 2:
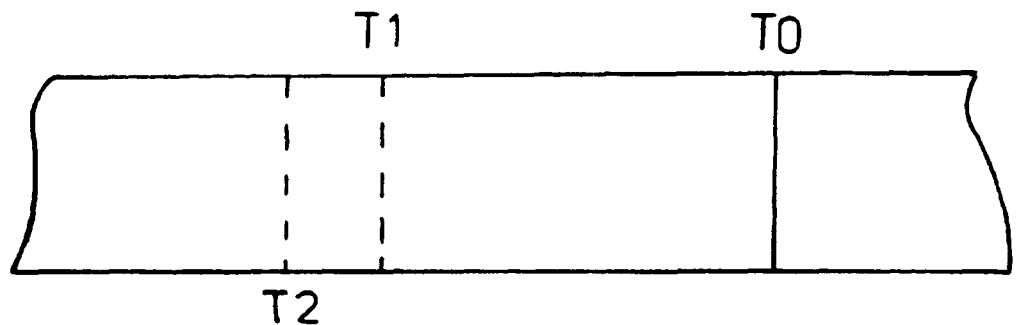
FIG. 2 is an operational diagram illustrating a recording control method of the present invention.
Figure 3:
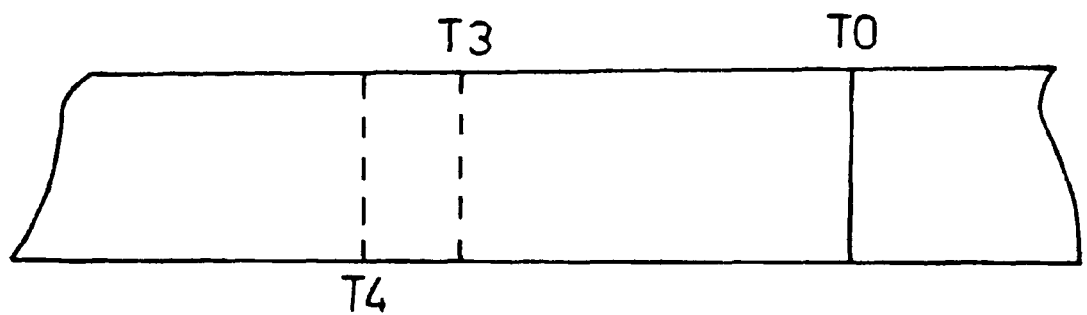
FIG. 3 is an operational diagram illustrating the recording control method of the present invention.

FIG. 1 is a block diagram showing an embodiment of an optical disc recording and playback apparatus relating to the present invention. FIGS. 2 and 3 are operational diagrams illustrating the recording control method of the present invention.

In FIG. 1, a disc D, which is mounted onto a turntable 2 rotationally driven by a spindle motor 1, is rotationally driven by the rotation of the turntable 2. Furthermore, the disc D has been recorded with positional information along a wobble groove, and the signal recording and playback operations are performed on the basis of the wobble signal obtained from this groove. An optical pickup 3, which has a built-in laser element (not shown) for emitting a light beam to the disc D, a monitor diode for monitoring the level of the light beam light emitted from the laser element, and a light detector for receiving the light beam reflected from the signal surface of the disc D, is moved in a radial direction on the disc D by a pickup feed motor (not shown).

An RF signal amplifier circuit 4 performs amplification and wave-shaping of an RF signal obtained from the light detector that is built into the optical pickup 3. A pickup control circuit 5, which has a built-in focus servo circuit and a tracking servo circuit, performs a focusing control operation for focusing the light beam that is output from the optical pickup 3 onto the signal surface of the disc D on the basis of a signal, such as the one obtained via the RF signal amplifier circuit 4, and a tracking control operation for tracking the light beam to a signal track on the signal surface.

A digital signal processing circuit 6 performs digital signal processing on signals that are output from the RF signal amplifier circuit 4 and performs demodulation on various types of signals. A signal playback circuit 7 inputs a digital signal that has undergone signal processing by the digital signal processing circuit 6, and implements an action to convert the information to an analog signal, then outputs it, such as to an amplifier, when the information recorded on the disc D is an audio signal, or an action to output the information without change as a digital signal to a computer apparatus 8 provided as a host when the information is a digital signal, such as computer software.

A system control circuit 9 inputs the signal demodulated by the digital signal processing circuit 6 and performs various control operations in accordance with command signals that are output from the computer apparatus 8. A signal recording circuit 10 inputs a recording signal, such as a test signal or an information signal, and corresponding to this signal, controls the laser emission operation by a laser drive circuit 11 so as to record signals, such as data signals, onto the disc D. Furthermore, the laser drive circuit 11 has a built-in laser servo circuit for controlling the laser output on the basis of the signal obtained from the monitor diode built into the optical pickup 3.

A buffer RAM 12, which is first stored with the signal to be recorded onto the disc D, is configured so that it is written with the signal that is output from the computer apparatus 8, and the control operation of the system control circuit 9 controls the storage operation and the read operation of the signal. Then, the signal stored in the buffer RAM 12 is in a storage hold state even after being read out for recording to the disc D. Thereafter, a new signal that is output from the computer apparatus 8 is stored into that location thereby sequentially overwriting and erasing the previous content.

A spindle motor drive circuit 13 has its operation controlled by the system control circuit 9 and has an action for controlling the rotational drive of the spindle motor 1, which rotationally drives the disc D, at a speed for performing the recording and playback operations. A reference signal generator circuit 14 generates a recording reference signal for use in recording signals to the disc D. A synchronization detection circuit 15 detects whether the synchronization signal that is sampled during playback from the disc D and the recording reference signal that is generated from the reference signal generator circuit are in synchronization.

In this configuration, during the signal recording operation to the disc D, the recording signal that is output from the computer apparatus 8 is stored into the buffer RAM 12, and by controlling the read operation of the stored signal, the signal recording operation to the disc D is controlled. Then, after the signal recording operation to the disc D is interrupted, the recording operation is resumed by performing an operation to compare the signal held and stored in the buffer RAM 12 and the signal recorded on the disc D prior to the interruption of the recording so that the signal is recorded in succession to the signal that was recorded prior to the interruption, namely, the signal is recorded in what is called a seamless manner.

Furthermore, while the signal recording operation to the disc D is being performed, the final address of the location where normal recording was performed is stored in a memory circuit provided within the system control circuit 9. If a buffer under run state occurs where the quantity of the recording signals stored in the buffer RAM 12 is insufficient during the recording operation, and the recording operation is interrupted, it is possible to perform the recording operation of the signal in a seamless manner from the interrupted location on the basis of the final address stored in the memory circuit.

The optical disc recording and playback apparatus relating to the present invention has the configuration as described above. The playback operation in the circuit configured in this manner will be described next. When a command signal for performing the playback operation is output from the computer apparatus 8 to the system control circuit 9 comprising the optical disc recording and playback apparatus, a control operation by the system control circuit 9 for the playback operation begins. When this playback operation is performed, a driving current is supplied from the laser drive circuit 11 to the laser element that is built into the optical pickup 3 to obtain a laser output for performing the signal read operation.

When a control operation for this playback operation begins, a rotational control operation of the spindle motor 1 is performed by the spindle motor drive circuit 13. The rotational control operation of the spindle motor 1 rotationally drives the disc D at a constant linear velocity by comparing the synchronization signal obtained from decoding the wobble signal and a reference signal that is output from a reference signal generator circuit (not shown) that is provided within the system control circuit 9. This rotational control operation for the spindle motor 1 is also performed in a similar manner during the signal recording operation to be described hereinafter.

The rotational control operation of the spindle motor 1 is performed as described above. At the optical pickup 3 for performing the signal read operation, the focusing control operation and the tracking control operation by the pickup control circuit 5 begin and the signal read operation from the disc D by the optical pickup 3 begins. Prior to the playback operation, an operation is performed to read the TOC data recorded in the lead-in area comprising the first session on the disc D.

The playback operation for reading the signal that has been recorded in the signal recording area of the first session recorded on the disc D is performed according to the TOC data recorded in the lead-in area. The signal that was read by the optical pickup 3 passes through the RF signal amplifier circuit 4 where it is amplified and wave shaped, and is then input by the digital signal processing circuit 6 where a demodulation operation of the signal is performed. When signal processing is performed by the digital signal processing circuit 6 and information is sampled, the information undergoes signal processing, such as error correction, and is then supplied to the signal playback circuit 7.

The signal playback circuit 7 converts the information that was read from the disc D into an analog signal, then outputs it, such as to an amplifier, when the information is an audio signal, and outputs the information without change as a digital signal to the computer apparatus 8 when the information is a data signal, such as computer software.

The playback operation is performed in the present embodiment as described above. The signal recording operation to the disc D will be described next.

The operation for recording signals to the disc D first records a test signal to a test write area provided on the disc D so that an operation is performed to set a laser output that is optimum for the characteristics of the disc D. This setting operation is performed by recording the test signal while varying the laser output and then playing back the recorded signal. Since this operation is widely known, its description will be omitted.

When the setting operation of the laser output is performed, an operation is performed to read the information recorded in an area on the disc D called the buffer, namely, the positional information of the signal recorded in the signal recording area. Then, on the basis of the information read in this manner, a recognition operation is performed, such as for determining whether the recording operation of data signals is possible to the signal recording area provided on the disc D, or for determining the position where the recording operation is to be performed.

When this recognition process operation completes, the optical pickup 3 is moved to a position on the disc D where the recording operation is to begin, and the write operation of recording signals to the buffer RAM 12 is performed. When the signal write operation to the buffer RAM 12 is performed, the quantity of signals stored in the buffer RAM 12 gradually increases. When the stored quantity exceeds a predetermined amount, the signal stored in the buffer RAM 12 is read out, and the signal that is read out is fed to the signal recording circuit 10. As a result, a control operation of the laser drive circuit 11 by the signal recording circuit 10 is performed so that the signal is recorded to the disc D.

The signal recording operation to the disc D is performed by this operation. The signal write operation to the buffer RAM 12 is performed in accordance with the signal read operation from the buffer RAM 12. Then, while the recording operation is performing normally, every time the signal recording operation to the disc D is performed, an operation is performed to store an address indicating its location, namely, the final address, into the memory circuit.

Then, while the signal recording operation to the disc D is being performed, if the quantity of signals written to the buffer RAM 12 is compared and found to be smaller than the quantity of signals that are read for recording to the disc D, the quantity of signals stored in the buffer RAM 12 gradually decreases. When the quantity of signals stored in the buffer RAM 12 decreases and reaches a predetermined amount, namely, when an buffer under run state occurs, a control operation is performed to interrupt the recording operation to the disc D. When this interruption operation is performed, the signal read operation from the buffer RAM 12 is also interrupted.

When the signal recording operation to the disc D is interrupted, an operation is performed to move the optical pickup 3 to a position where the recording operation is to be resumed, namely, a position retracted from where the recording operation was interrupted. When this movement operation is performed, the signal write operation to the buffer RAM 12 begins. Then, the position to where the optical pickup 3 is retracted is determined on the basis of the time required for the quantity of the recording signals stored in the buffer RAM 12 to reach a recording resume preset value on the basis of the transfer speed of the recording signals that are output from the computer apparatus 8.

This operation is performed and the optical pickup 3 retracts to the desired position. When retracted to this position, the quantity of the recording signals stored in the buffer RAM 12 reaches the recording resume preset value, which is a predetermined value, so that a control operation is performed to resume the recording operation.

After the above-mentioned operation moves the optical pickup 3 to a desired position that is retracted from the position where the recording operation was interrupted, the recording resume operation is performed by performing the playback operation from that position. The position where recording was interrupted can be easily recognized from the final address that is stored in the memory circuit every time normal recording operation is performed, and the optical pickup 3 can be moved to the desired position based on the interrupted position as the origin.

The optical pickup 3 is retracted to the desired position and the playback operation begins. The signal that is played back by this playback operation is the signal that was recorded immediately prior to the interruption of the recording operation. By performing a comparison of this playback signal and the signal held and stored in the buffer RAM 12, a synchronization process is performed. When this comparison determines that both signals are the same signal, an operation is performed to read the signal stored in the buffer RAM 12 and stored in succession to the signal for the above-mentioned comparison, the signal is input by the signal recording circuit 10, and the signal recording operation to the disc D begins. The operation above makes it possible to interrupt and resume the signal recording to the disc D, and by performing this operation, it is possible to continuously record signals to the disc D and perform what is called a seamless recording operation even if the recording operation was interrupted.

The control operation is performed as described above when interrupting and resuming the recording operation. A synchronization control operation for resuming the recording operation from the recording interrupted position will be described next. This control operation performs a read operation of the signal recorded on the disc D prior to the interruption, then detects the synchronization signal, which is a reference signal, from the signal that was read. At the same time, an operation is performed to synchronize the recording reference signal that is generated from the reference signal generator circuit 14 and the above-mentioned synchronization signal that is obtained from the disc D. Then, the synchronization detection circuit 15 detects whether both reference signals are in synchronization in the synchronizing operation.

Once the synchronization detection circuit 15 detects that both reference signals are in synchronization, the recording operation to the disc D begins when the number of frames comprising the recording signals after synchronization reaches a predetermined number. This number of frames is set by taking into consideration the recording interrupted position and the time required for the process for starting recording to complete. Then, also after synchronization, the synchronization detection circuit 15 detects whether a deviation in synchronization has occurred between the recording reference signal that is generated from the reference signal generator circuit 14 and the reference signal that is obtained from the disc D. If a deviation in synchronization has not occurred, the recording operation is resumed.

Interruption and resumption of the recording operation when buffer under run has occurred are performed as described above. An operation for changing the recording speed will be described next. When the recording operation is being performed at a constant linear velocity at the inside of the disc D, the operation to change the recording speed is performed when the recording position has moved to a position where the recording operation can be performed at a high constant linear velocity.

The operation to switch the recording linear velocity is performed, for example, when changing the linear velocity from 16× to 20× with respect to the standard linear velocity. To perform this switching operation, it is necessary to first interrupt the recording operation, and then resume the recording operation. Namely, when the recording operation is being performed at a constant 16× linear velocity, a control operation is performed so that the recording operation is first interrupted, and the recording operation is resumed when the rotational speed of the disc D reaches a constant 20× linear velocity. This operation for interrupting and resuming the recording can be performed by utilizing the above recording control method for interrupting and resuming the recording when buffer under run occurs.

When the signal recording operation to the disc D is interrupted to change the recording linear velocity, an operation is performed to move the optical pickup 3 to the position where the recording operation is to be resumed, namely, a position that retracts from where the recording operation was interrupted in order to change the recording speed. When this movement operation is performed, the signal write operation to the buffer RAM 12 continues. In this case, the position where the optical pickup 3 is to be moved is set on the basis of the time required to change the recording speed, namely, the time required until the disc D reaches a state of rotation where the rotational speed of the spindle motor 1 is at a constant 20× linear velocity.

This operation will be described with reference to FIG. 2. In this Figure, point T0 is the position where the recording operation was interrupted, and point T1 and point T2 are the positions to where the optical pickup 3 is moved by the retract operation. With respect to point T1, the amount of retraction at point T2 is large. This means that the time required for the operation to change the recording speed is longer when the retraction to point T2 is performed. Namely, point T1 is for switching the speed from 16× to 20×, and point T2 is for switching the speed from 20× to 24×. The reason for changing the amount of retraction of the optical pickup 3 is that the time required for changing the recording speed lengthens with faster recording speeds.

The optical pickup 3 is retracted to the desired position that was set by the above-mentioned operation. When this movement operation is performed, the quantity of the recording signals stored in the buffer RAM 12 reaches the recording resume preset value, and a control operation is performed to resume the recording operation. Since this control operation is performed in a similar manner to the operation for when buffer under run occurs, its description will be omitted.

In the above description of the interruption and resumption of the recording operation that are performed for changing the recording speed, the amount that the optical pickup 3 is retracted is changed to correspond to the value of the linear velocity that is changed for the recording speed. However, it can also be set to correspond to the changed speed having the longest time required for the change operation, namely, the time required when changing to the fastest recording linear velocity supported by the optical recording and playback apparatus.

The above-mentioned embodiment was described when the optical pickup 3 was retracted in the case where the quantity of the recording signals stored in the buffer RAM 12 reached the recording resume amount. However, the case where the recording signals that are output from the computer apparatus 8 are insufficient when the recording speed is changed will be described with reference to FIG. 3.

In FIG. 3, point T0 is the position where the recording operation was interrupted, point T3 is the retracted position corresponding to the time required for changing the recording speed, and point T4 is the retracted position corresponding to the time required for the quantity of the recording signals stored in the buffer RAM 12 when the recording is interrupted to reach the recording resume amount.

In this case, with respect to the time required for changing the recording speed, the time required for the quantity of the recording signals stored in the buffer RAM 12 to reach the recording resume amount is longer so that the retracted position of the optical pickup 3 is set to point T4. In this case, the control operation for resuming the recording is performed from the point where the optical pickup 3 was retracted, and the recording operation after the recording speed change is resumed.

In this manner, this embodiment performs an operation to change the rotational speed of the spindle motor for rotationally driving the disc and an operation to retract the optical pickup so that the recording speed change operation can be performed quickly.

Furthermore, the change in recording speed is performed at least at two locations on the disc and the position where the optical pickup is to be retracted is set on the basis of the time required to change the recording linear velocity so that the optical pickup can be retracted to a position that is optimum for the operation to change the respective recording speed.

It is also preferable for the change in recording speed to be performed at least at two locations on the disc and for the position where the optical pickup is to be retracted to be set on the basis of the longest time required to change the respective recording linear velocity. As a result, the retracted position of the optical pickup can be fixed so that the control operation can be easily performed.

Furthermore, if the time required for the stored quantity of the recording signals stored in the buffer RAM to reach the amount that has been set for the recording resume operation is longer than the time required to perform the recording speed change, it is also preferable to set the position where the optical pickup is to be retracted on the basis of the time required for the stored quantity of the buffer RAM to reach the amount that has been set for performing the recording resume operation. As a result, the retract operation of the optical pickup can be performed in accordance with the recording state and the recording operation according to the present invention can be performed quickly.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A disc recording and playback apparatus for recording a recording signal to a disc by moving a pickup in a radial direction on a rotating disc and tracing a track on said disc so as to record the recording signal onto said disc, and to change a signal recording linear velocity with respect to the disc when a signal recording position reaches a speed change position in a radial direction on the disc, said disc recording and playback apparatus comprising:

a signal control circuit for interrupting the recording of the recording signal at an interrupted position when said recording position reaches said speed change position and for resuming the recording of the recording signal from the interrupted position;

a pickup control circuit for retracting said pickup a predetermined amount in a direction of already recorded signals on the disc and for resuming the tracing of the track on the disc from that position; and a rotational control circuit for changing the disc rotational speed to attain the recording linear velocity after the change, concurrently with the retraction of said pickup, when said recording position by a recording position detector reaches a predetermined position;

said predetermined amount for retracting said pickup by said pickup control circuit is set according to a time required for changing the rotational speed after the rotational speed of said disc is changed.

2. A disc recording and playback apparatus according to claim 1 wherein:

said signal control begins signal playback from the disc with said pickup from a predetermined retracted position, and switches from playback to recording when the interrupted position is reached.

3. A disc recording and playback apparatus according to claim 1 wherein:

said recording linear velocity change is performed at least at two locations on the disc, and the predetermined amount that said pickup retracts is set in accordance to the time required to change the respective recording linear velocity.

4. A disc recording and playback apparatus according to claim 3 wherein:

the predetermined amount that said pickup retracts is set large when changing to a faster recording linear velocity.

5. A disc recording and playback apparatus according to claim 1 wherein:

said recording linear velocity is performed at least at two locations on the disc, and the predetermined amount that said pickup retracts is set in accordance to a longest time required to change the respective recording linear velocity.

6. A disc recording and playback apparatus according to claim 1 further comprising:

a buffer for temporarily storing recording signals that are supplied from an external source;

the recording signals that are read from this buffer are recorded onto said disc via the pickup; and during said recording interruption, the writing of recording signals to the buffer from the external source is continued.

7. A disc recording and playback apparatus according to claim 6 wherein:

in a case where the quantity of recording signals stored in said buffer is less than a recording resume preset value that has been set for performing an operation to resume recording, when said recording position reaches said speed change position;

the time required for the quantity of recording signals to the buffer to reach the recording resume preset value, and the time required to change said disc rotational speed are compared; and said predetermined amount for retracting the pickup is set on the basis of a longer time.

* * * * *